(12) United States Patent  
Oosawa (10) Patent No.: US 7,620,222 B2
(45) Date of Patent: Nov. 17, 2009

(54) METHOD, APPARATUS, AND PROGRAM FOR JUDGING IMAGES

(75) Inventor: Akira Oosawa, Kaisei-machi (JP)

(73) Assignee: FUJIFILM Corporation, Tokyo (JP)

( * ) Notice: Subject to any disclaimer, the term of this patent is extended or adjusted under 35 U.S.C. 154(b) by 576 days.

(21) Appl. No.: 10/803,895

(22) Filed: Mar. 19, 2004

(65) Prior Publication Data

US 2004/0184646 A1 Sep. 23, 2004

(30) Foreign Application Priority Data

Mar. 19, 2003 (JP) ............................. 2003-075647

(51) Int. Cl.
G06K 9/00 (2006.01)
(52) U.S. Cl. ..................................... 382/128
(58) Field of Classification Search ................. 382/128, 382/132, 311; 378/62, 37, 62.37; 250/584
See application file for complete search history.

(56) References Cited

U.S. PATENT DOCUMENTS

| | | | | |
|---|---|---|---|---|
| 5,732,121 | A | * | 3/1998 | Takeo et al. ................... 378/62 |
| 5,761,334 | A | * | 6/1998 | Nakajima et al. ........... 382/132 |
| 6,112,112 | A | * | 8/2000 | Gilhuijs et al. ............... 600/425 |
| 7,079,674 | B2 | * | 7/2006 | Paragios et al. ............. 382/128 |
| 7,187,789 | B2 | | 3/2007 | Takeo |
| 2002/0172403 | A1 | * | 11/2002 | Doi et al. ..................... 382/128 |
| 2007/0019848 | A1 | | 1/2007 | Takeo |

FOREIGN PATENT DOCUMENTS

JP 2002-74325 A 3/2002
JP 2002074327 A 3/2002

OTHER PUBLICATIONS

J. Wei, et al., "Characteristics Analysis of Convergence Index Filters", Journal of the Society of Electronic Information Communications (D-11), vol. J84-D-II No. 7. pp. 1289-1298, 2001.
J. Wei, et al., "Convergence Index Filter for Detection of Lung Nodule Candidates", Journal of Society of Electronic Information Communication (D-II), vol. J83-D-II No. 1, pp. 118-125, Jan. 2000.

(Continued)

Primary Examiner—Brian P Werner
Assistant Examiner—Claire Wang
(74) Attorney, Agent, or Firm—Sughrue Mion, PLLC (57) ABSTRACT

Tumors are judged by a medical image diagnosis aiding apparatus that employs a computer, based on image patterns, which are obtained from the density values of images and which are inherent in medical images, in a manner approximating human visual perception. Candidate regions of patterns are extracted from medical image data. The type of pattern of the candidate regions is judged by employing characteristic amounts of an inner/outer outline image, which is an image of the vicinity of the outline of the extracted candidate region.

20 Claims, 9 Drawing Sheets

OTHER PUBLICATIONS

S. Furuya, et al., "Improvement of Detection Performance of Tumors on Mammograms by Sub-optimal Feature Set", Society of Electronic Information Communications, vol. 100 No. 434, pp. 93-100, 2001.

H. Kobatake, M. Murakami, et al., "Computerized Detection of Malignant Tumors on Digital Mammograms," IEEE Transactions on Medical Images, vol. 18, No. 5, pp. 369-378, 1999.

M. Ginger, Z. Huo, C. Vybomy, L.Lan, I. Bonta, K. Horsch, R. Nishikawa, and I. Rosenborough, "Intelligent CAD Workstation for Breast Imaging Using Similarity to Known Lesions and Multiple Visual Prompt Aids," Proceedings of SPIE, Medical Imaging 2002, Feb. 2002, San Diego.

* cited by examiner

OUTLINE EXTERIOR

OUTLINE EDGE

OUTLINE INTERIOR

| IMAGE IN QUESTION | | PRE RECORDED IMAGE | |
|---|---|---|---|
| OUTLINE | INNER/OUTER OUTLINE IMAGE | INNER/OUTER OUTLINE IMAGE | OUTLINE |
|  |  |  |  |
|  |  |  |  |
|  |  |  |  |
|  |  |  |  |
|  |  |  |  |
|  |  |  |  |

METHOD, APPARATUS, AND PROGRAM FOR JUDGING IMAGES

BACKGROUND OF THE INVENTION

1. Field of the Invention

The present invention relates to a computer assisted image diagnosis apparatus that detects abnormal patterns within an image, based on medical image data, which is obtained by photographing a subject, and displays the abnormal pattern.

2. Description of the Related Art

Conventionally, image processes are administered to images, which are obtained by various image obtainment methods, to improve the image reading properties thereof. The image processes include gradation processes and frequency processes. Particularly in the field of medical images, such as radiation images having humans as the subjects thereof, it is necessary that experts such as physicians accurately diagnose the existence of disease and injuries in a patient, based on the obtained images. Therefore, image processes to improve the image reading properties of these images are crucial. For this reason, various methods have been proposed, in which image processes are employed so that tumor patterns can be diagnosed objectively, regardless of an observer's experience or image diagnosis capabilities.

Cancerous tumor patterns which are photographed as radiation images have a substantially rounded outline. At the same time, the tumor patterns are observed as regions having higher pixel values compared to their surroundings in the images. These tumor patterns are recognized as having a characteristic density value gradient. The characteristic density value gradient is that in which density values decrease from the edges toward the center of a semispherical region, in which equal density values spread in a concentric manner (hereinafter, referred to as "circular protrusion region"). These gradient lines concentrate toward the center of the rumor. By calculating the gradient of the density values as gradient vectors, tumor patterns can be detected from the degree of concentration of the gradient vectors (refer to J. Wei, Y. Ogihara, A. Shimizu, and H. Kobatake, "Characteristics Analysis of Convergence Index Filters", Journal of the Society of Electronic Information Communications (D-II), Vol. J84-D-II No. 7, pp. 1289-1298, 2001, and J. Wei, Y. Ogihara, and H. Kobatake, "Convergence Index Filter for Detection of Lung Nodule Candidates", Journal of the Society of Electronic Information Communications (D-II), Vol. J83-D-II No. 1, pp. 118-125, January 2000).

The size and shapes of filters for evaluating these degrees of concentration are designed to achieve detection capabilities which are unaffected by the size and/or shape of the tumor. Representative examples of such filters are iris filters and adaptive ring filters.

The iris filter outputs its maximum output value at the outlines of the circular protrusion regions, thereby enabling detection of candidate regions for abnormal patterns (refer to U.S. Pat. No. 5,761,334). On the other hand, the adaptive ring filter outputs extremely large values in the vicinity of the centers of the circular protrusion regions (refer to J. Wei et al., "Convergence Index Filter for Detection of Lung Nodule Candidates", Journal of the Society of Electronic Information Communications (D-II), Vol. J83-D-II No. 1, pp. 118-125, January 2000).

A method for detecting abnormal pattern candidates is proposed in U.S. Pat. No. 5,732,121. In this method, candidate regions for abnormal patterns are detected by an iris filter or the like. Then, density histograms are derived for the interior of the candidate regions. Dispersion values, contrasts, angular moments and the like are calculated as characteristic amounts, based on the histograms. Evaluative function values are calculated from the characteristic amounts by a predetermined weighting function. Judgments are made regarding whether the candidate regions are malignant patterns, based on the calculated evaluative function values. In this manner, only malignant patterns are detected as abnormal pattern candidates.

Another method for detecting whether candidate regions are abnormal patterns is disclosed in U.S. Pat. No. 5,732,121 and Japanese Unexamined Patent Publication No. 2002-74325. In this method, normal patterns and abnormal patterns are classified into clusters according to characteristic amounts, which are based on previously obtained density histograms of candidate regions. When a candidate region appears in medical image data, a Mahalanobis distance Dm1 is measured from the candidate region to the pattern class that represents normal patterns. In addition, a Mahalonobis distance Dm2 is measured from the candidate region to the pattern class that represents abnormal patterns. Thereby, whether the candidate region corresponds to an abnormal pattern is detected.

Further, there are computer assisted diagnosis (CAD) systems that combine the aforementioned methods to reduce the burden on an observer, and to improve the quality of diagnosis. An example of the CAD system is disclosed in S. Furuya, J. Wei, Y. Ogihara, A. Shimizu, H. Kobatake, and S. Nawano, "Improvement of Detection Performance of Tumors on Mammograms by Sub-optimal Feature Set", Society of Electronic Information Communications, Vol. 100 No. 434, pp. 93-100, 2001. The operations of the CAD system are as follows.

1) First, circular protrusion regions within original images are emphasized, by utilizing adaptive ring filters.
2) Next, extremely high points of the filter output values are extracted, and several (e.g., seven) high points are extracted as tumor candidate points.
3) Iris filters and a Snakes method are applied to the tumor candidate points, to extract tumor candidate regions. The Snakes method extracts outlines as optimal solutions, based on an energy minimization principle. The outputs of the iris filters are employed as Snakes energy. Details of the algorithm for candidate region determination according to the Snakes method are disclosed in H. Kobatake, M. Murakami, et al., "Computerized Detection of Malignant Tumors on Digital Mammograms", IEEE Transactions on Medical Images, Vol. 18, No. 5, pp. 369-378, 1999.
4) Further, characteristic amounts are calculated from each of the determined candidate regions, and the candidate regions are classified into clusters of malignant tumor patterns ad benign tumor patterns, based on Mahalonobis distances.

In this manner, whether tumors are malignant or benign is judged, based on shape extraction results.

In addition, a CAD system has been proposed, wherein images, having visual characteristics similar to a medical image being observed, are searched for in a database of past cases (refer to M. Ginger, Z. Huo, C. Vybomy, L. Lan, I. Bonta, K. Horsch, R. Nishikawa, and I. Rosenborough, "Intelligent CAD Workstation for Breast Imaging Using Similarity to Known Lesions and Multiple Visual Prompt Aids", Proceedings of SPIE, Medical Imaging 2002, February 2002, San Diego).

The aforementioned diagnosis assistance techniques make judgments based on abstracted characteristic amounts, such as the shapes and sizes of the candidate regions and the density contrasts thereof. Therefore, the judgments do not necessarily match with the visual perception of humans. For this reason, there are cases in which tumors that were judged as being similar are not similar, when viewed visually. For example, there are cases in which tumor images dissimilar to a tumor image in question are located from a database of past cases, when similar images are searched for.

SUMMARY OF THE INVENTION

The present invention has been developed in view of the aforementioned problem. It is the object of the present invention to provide an image judging apparatus that analyzes tumors in a manner approximating human visual perception, based on image patterns, which are obtained from the density values of images and which are inherent in medical images.

The image judging apparatus of the present invention comprises:

a candidate region extracting means for extracting candidate regions for predetermined patterns from medical image data;

an inner/outer outline image extracting means for extracting inner/outer outline images, which are in the vicinity of the outline of the candidate regions extracted by the candidate region extracting means; and a pattern judging means for judging the type of pattern within the candidate regions, by employing characteristic amounts of the inner/outer outline image extracted by the inner/outer outline image extracting means.

The method for judging images of the present invention comprises the steps of:

extracting candidate regions of specific patterns from medical image data;

extracting inner/outer outline images, which are in the vicinity of the outline of the extracted candidate regions; and judging the type of pattern within the candidate regions, by employing characteristic amounts of the extracted inner/outer outline image.

The program of the present invention causes a computer to execute a method for judging images, comprising the procedures of:

extracting candidate regions of specific patterns from medical image data;

extracting inner/outer outline images, which are in the vicinity of the outline of the extracted candidate regions; and judging the type of pattern within the candidate regions, by employing characteristic amounts of the extracted inner/outer outline image.

Here, the "pattern" refers to normal patterns, such as blood vessels, and abnormal patterns that represent various symptoms, such as tumors, tumorous boils, and cancer. The patterns are observed in a variety of positions, such as the breasts and the thorax.

Note that the program of the present invention may be provided being recorded on a computer readable medium. Those who are skilled in the art would know that computer readable media are not limited to any specific type of device, and include, but are not limited to: floppydisks, CD's RAM's, ROM's, hard disks, magnetic tapes, and internet downloads, in which computer instructions can be stored and/or transmitted. Transmission of the computer instructions through a network or through wireless transmission means is also within the scope of this invention. Additionally, computer instructions include, but are not limited to: source, object and executable code, and ca be in any language, including higher level languages, assembly language, and machine language.

The "candidate regions of specific patterns" are extracted by focusing on the fact that the patterns exhibit densities different from those of the background image.

Specifically, an iris filter or the like may be employed to extract regions which are tumor candidates from the image. Alternatively, the candidate regions may be more accurately extracted by employing the Snakes method, based on the central positions (candidate points) of regions extracted as tumor candidates by an iris filter or the like.

An iris filter extracts candidate regions by focusing on density gradient values, and extracts regions having high degrees of density gradient concentration within an image. Methods other than an iris filter may be employed. For example, circular regions having low density (i.e., are white) may be extracted.

The Snakes method extracts more accurate tumor shapes, based on candidate regions (points) extracted by an iris filter. For example, points along a circumference at a predetermined radius having a candidate point at their center maybe extracted as initial values. The Snakes method defines the outline edge of a pattern as having extremely low image energy. Then, the curves in the vicinity of the outline of the pattern, which were set as initial values, are gradually moved so that the energy on the curves is extremely low. The candidate region is extracted where the curves converge.

The "inner/outer outline image" refers to an image of the edge of the candidate region outline, within a predetermined range from the edge. Examples of the "characteristic amounts of the inner/outer outline image" include characteristic amounts based on density patterns that occur in the inner/outer outline image, and characteristic amounts (dispersion value, contrast, angular momentum, etc.) based on a density histogram of the inner/outer outline image.

There are normal and abnormal patterns. Further, there are benign and malignant patterns among the abnormal patterns. The type of pattern may be one from among: a normal pattern, an abnormal pattern, a benign abnormal pattern, and a malignant abnormal pattern.

The malignant abnormal patterns may be classified in further detail, such as into malignant abnormal pattern type 1 and malignant abnormal pattern type 2.

Alternatively, judgments may be made regarding to which symptoms the patterns are similar to, and the types of patterns may be the types of symptoms that the patterns are similar to.

A configuration may be adopted wherein:

the inner/outer outline image extracting means divides the inner/outer outline image into two or more regions comprising an outline edge, an outline interior and an outline exterior; and the pattern judging means judges the type of pattern based on the characteristic amount of at least one of the regions.

Dividing the inner/outer outline image into "two or more regions comprising an outline edge, an outline interior and an outline exterior" refers to dividing the image into regions using the outline of the candidate region as a reference. The inner/outer outline image may be divided into three regions, consisting of the outline edge, the outline interior and the outline exterior, or two regions, consisting of the outline interior and the outline exterior, for example. It is desirable that the inner/outer outline image is divided into regions having different characteristics. The inner/outer outline image may be divided so that portions of the regions overlap.

In addition, a configuration may be adopted wherein the image judging apparatus further comprises:

a density pattern extracting means, for extracting density patterns, which are present within unit pixel groups that constitute the inner/outer outline images, extracted by the inner/outer outline image extracting means;

a presence frequency calculating means, for judging which of the density patterns the unit pixel groups of the inner/outer outline images are similar to, and calculating presence frequencies by counting the presence of the similar density patterns within the inner/outer outline image; and a classifying means, for classifying the inner/outer outline images according to the type of pattern, based on the presence frequencies of the density patterns; wherein the pattern judging means judges to which classification the candidate region belongs, from among the classifications of the inner/outer outline images, which were classified according to the type of pattern by the classifying means, by employing the presence frequencies of the density patterns therein, derived by the presence frequency calculating means, as characteristic amounts.

The "unit pixel groups" are pixels within a small region of the image, which serve as units during analysis of the image. It is preferable that the unit pixel groups are approximately 20 pixels by 20 pixels, for example.

"Extracting density patterns, which are present within unit pixel groups" refers to extracting density patterns which are often present in the unit pixel groups that constitute the inner/outer outline images. It is possible to extract the density patterns by employing pattern analyzing methods such as Kohonen self organizing maps (hereinafter, referred to as "SOM").

"Classifying the inner/outer outline images according to the type of pattern, based on the presence frequencies of the density patterns" refers to classifying the inner/outer outline images according to which tumor type they belong to, based on the presence frequency (histogram) of each density pattern therein. Specifically, it is possible to classify the inner/outer outline images by employing a cluster analysis method such as SOM. Alternatively, different cluster analysis methods, such as distance functions (e.g., Mahalanobis distance method), which represent concepts of distance, and degree of similarity methods, may be employed.

According to the image judging apparatus of the present invention, the type of pattern is judged based on the characteristic amounts of the inner/outer outline images at the vicinity of the outline of the candidate regions. Therefore, the type of pattern can be judged regardless of the shape of the pattern.

More accurate judgment becomes possible, by dividing the inner/outer outline image into regions having distinct characteristics, such as the outline edge, the outline interior, and the outline exterior.

Further, judgment results approximating human visual perception can be obtained, by judging the types of patterns based on presence frequencies of density patterns which are present in the unit pixel groups that constitute the inner/outer outline images.

DESCRIPTION OF THE PREFERRED EMBODIMENTS

Figure 1:
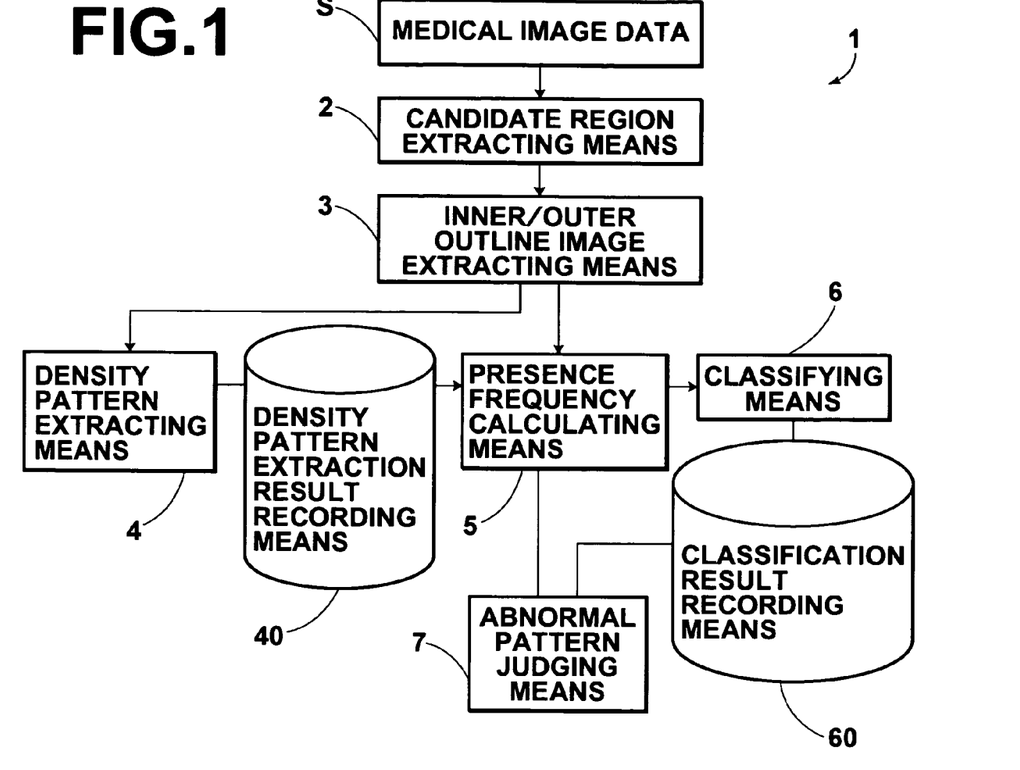
FIG. 1 is a block diagram illustrating the schematic construction of an image judging apparatus.

Hereinafter, the image judging apparatus of the present invention will be described in detail with reference to the attached drawings. FIG. 1 is a block diagram illustrating the schematic construction of an image judging apparatus 1.

The image judging apparatus 1 comprises: a candidate region extracting means 2; an inner/outer outline image extracting means 3; a density pattern extracting means 4; a presence frequency calculating means 5; a classifying means 6, and a pattern judging means 7. The candidate region extracting means 2 extracts candidate regions for patterns from medical image data S. The inner/outer outline image extracting means 3 extracts inner/outer outline images, which are in the vicinity of the outline of patterns. The density pattern extracting means 4 extracts density patterns which are present in unit pixel groups that constitute the inner/outer outline images. The present frequency calculating means 5 calculates the frequencies that the density patterns are present within the inner/outer outline images. The classifying means 6 classifies the inner/outer outline image into types of patterns, based on the presence frequencies of the density patterns within the inner/outer outline images. The pattern judging means judges to which type of pattern a pattern within an inner/outer outline image of interest belongs, based on the presence frequency of density patterns therein.

The candidate region extracting means 2 extracts candidate regions for patterns from medical image data S. Specifically, regions, which are tumor candidates within an image, are extracted by employing an iris filter or the like. Alternatively, the candidate regions may be more accurately extracted by employing the Snakes method, based on the central positions (candidate points) of regions extracted as tumor candidates by an iris filter or the like.

An iris filter extracts candidate regions by focusing on gradients of density values. For example, the iris filter may extract regions having the seven highest degrees of density gradient concentration within the image. Methods other than an iris filter may be employed. For example, a predetermined number of the largest circular regions having low density (i.e., are white) may be extracted.

The Snakes method extracts more accurate tumor shapes, based on candidate regions (points) extracted by an iris filter. For example, points along a circumference at a predetermined radius having a candidate point at their center may be extracted as initial values. The Snakes method defines the outline edge of a pattern as having extremely low image energy. Then, the curves in the vicinity of the outline of the pattern, which were set as initial values, are gradually moved so that the energy on the curves is extremely low. The candidate region is extracted where the curves converge. There are three types of energy, the three types being inner energy, image energy, and outer energy. It is preferable to employ output values, which utilize the fact that the total sum of the gradient values becomes maximal along radii, which are drawn outward from the candidate point extracted by the iris filter, as the image energy.

In the present embodiment, a case in which the Snakes method is employed to extract candidate regions for patterns will be described. First, the operating principles of the Snakes method will be described with reference to FIG. 2. Snakes is a curve, which has physical properties similar to a rubber band, and which is hypothetically placed within the image. A shape is extracted, by moving the curve so that the total sum of the image energy, which is the image energy obtained from the density of the medical image data S, stabilizes in an extremely low state on the Snakes curve.

Figure 2:
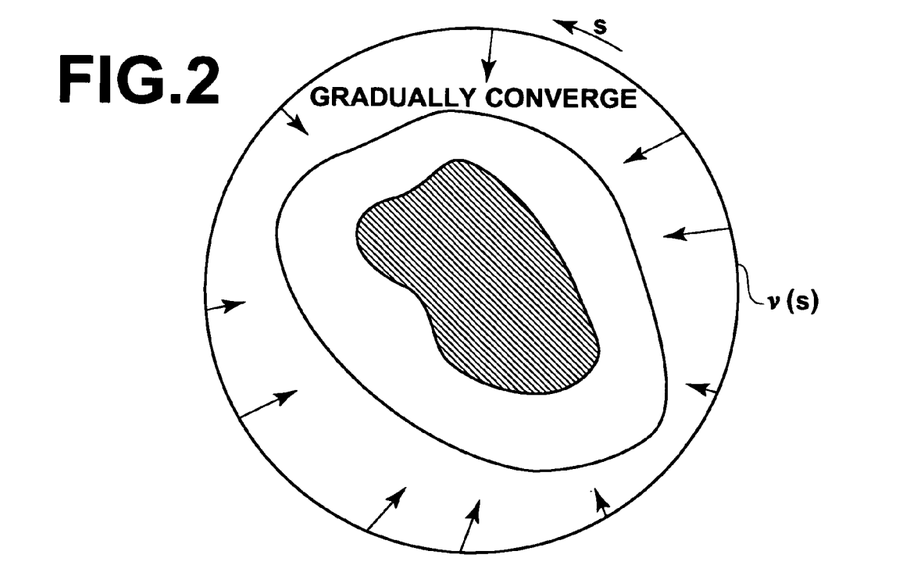
FIG. 2 is a diagram that illustrates the operating principle of the Snakes method.

First, the image energy is defined to have extremely low values on the outline of the shape to be extracted from the medical image data S. Then, the initial position of the Snakes curve is set in the vicinity of the outline of the target shape. The target shape is extracted by moving the Snakes curve so that the total sum of the image energy thereon becomes minimal. FIG. 2 shows the manner in which the Snakes curve v(s) is gradually converged toward the outline of the region (the portion indicated by hatching) to be extracted.

Generally, the total sum of image energy that determines the movement of the Snakes curve is given by the following Formula (1).

$$E = \int_0^1 \{Eint(v(s)) + Eimage(v(s)) + Econ(v(s))\} ds \quad \text{Formula (1)}$$

wherein Snakes: v(s)=(x(s), y(s)), and
s: 0~1 s is a parameter on the closed curve. s=0 is the starting point, and s=1 is the endpoint (in the case of a closed curve, the positions of s=0 and s=1 match).

Eint is the interior energy of the Snakes curve, Eimage is the image density energy, which depends on the density, which is the characteristic amount of the image, and Econ is the outer energy, of the outer constraining force.

(1) Interior Energy Eint

The interior energy Eint is defined by a linear sum of the squares of the length vs and the curvature vss of the Snakes curve, and is given by the following formula (2).

$$Eint(v(s)) = \frac{\alpha(s)|v_s|^2 + \beta(s)|v_{ss}|^2}{2} \quad \text{Formula (2)}$$

wherein $v_s = \frac{dv}{ds}$;

$v_{ss} = \frac{d^2v}{ds^2}$; and $\alpha$ and $\beta$ are constants.

The interior energy Eint adjusts the divergence and convergence of the Snakes curve v(s).

(2) Image Density Energy Eimage

The image energy Eimage is defined as energy, based on the density of the medical image data S, that becomes extremely small in the vicinity of the target shape. The image energy Eimage, represented by characteristic amounts of the image, such as the density, the density gradient, and the like, is defined to be minimal at the edges of the pattern. For example, the image energy Eimage may be defined to be minimal, employing the output values of an iris filter (which gives maximal values at the outlines of circular protrusion regions).

(3) Outer Constraining Energy Econ

The outer constraining energy Econ is deliberately provided to change the behavior and the quality of the Snakes curve. By providing an appropriate outer constraining energy Econ, the Snakes curve is adjustable so that it is enabled to converge on the outline, even in the case that the initial position thereof is set far away from the edge.

The Snakes curve v(s) is changed so that the total sum E (Formula (1)) of the energy as defined above become minimal. The candidate region is extracted at the position where the total sum E of the energy is at its minimum value, where it is assumed that the Snakes curve v(s) is substantially matched with the outline.

Figure 3:
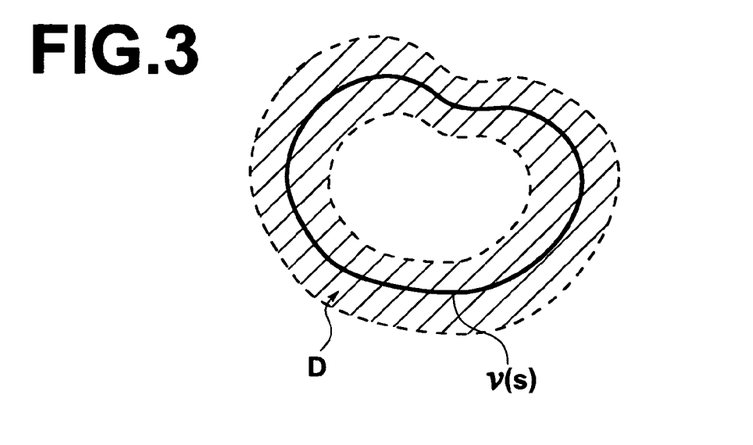
FIG. 3 is a diagram that illustrates the relationship between an outline and an inner/outer outline image.

The inner/outer outline image extraction means 3 extracts inner/outer outline images D, which are in the vicinity of the outline v(s) having the shape extracted by the candidate region extracting means 2, as shown in FIG. 3. The inner/outer outline image D is an image of an area within a predetermined range from the outline. It is possible to divide the inner/outer outline image D into regions such as the outline interior, the outline exterior, and the outline edge. Such division enables detailed classification of tumor patterns, by observing the characteristic amounts, which are present in each of the regions.

Figure 4A:
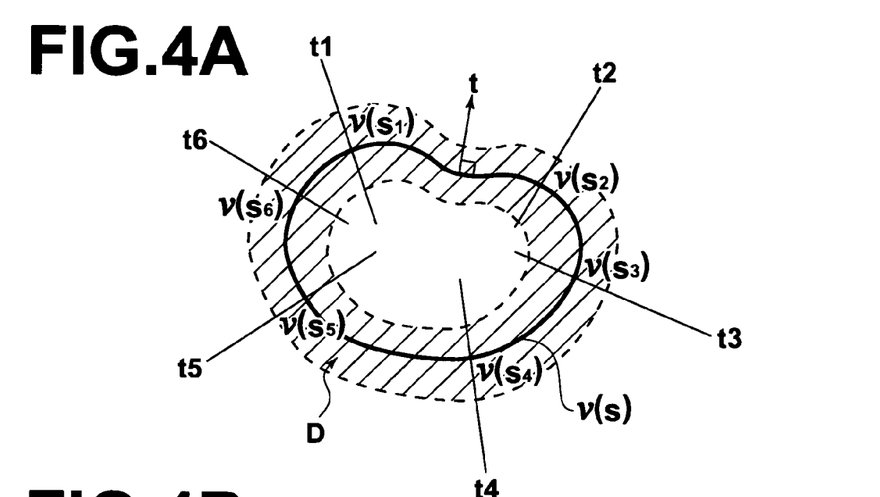
FIGS. 4A and 4B are diagrams for explaining a first case of conversion of the inner/outer outline image.
Figure 4B:
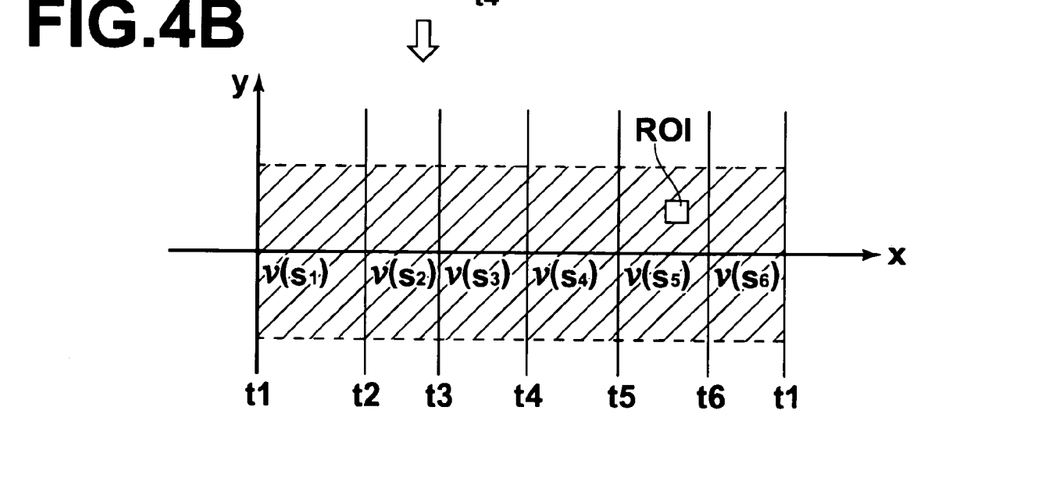

It is preferable that the inner/outer outline image D is observable without dependency on the shape of the outline. Therefore, it is desirable that the inner/outer outline image D is converted to a unified shape, with the outline v(s) as a reference. For example, as shown in FIG. 4A and FIG. 4B, the inner/outer outline image D is converted into a rectangular shape. In the rectangular shape, the extracted outline v(s) is converted to become a straight line along the x direction, while directions t (t1, t2, t3, t4, t5, and t6) perpendicular to the outline v(s) are converted to match the y direction.

Figure 5A:
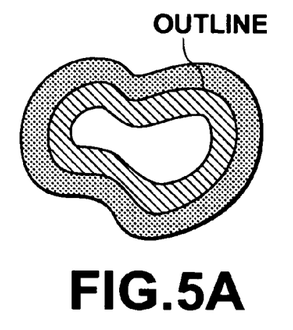
FIGS. 5A, 5B, and 5C are diagrams for explaining a second case of conversion of the inner/outer outline image.
Figure 5B:
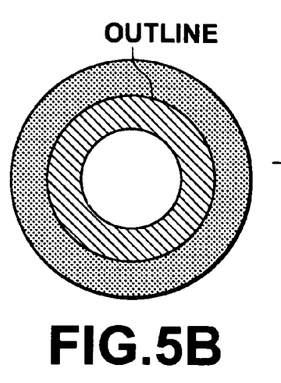
Figure 5C:
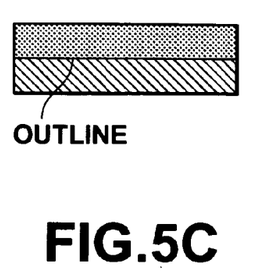

In this manner, patterns having different outline shapes, as illustrated in FIGS. 5A and 5B, are converted into inner/outer outline images D having the same shape, as illustrated in FIG. 5C, which facilitates comparisons therebetween.

Figure 6A:
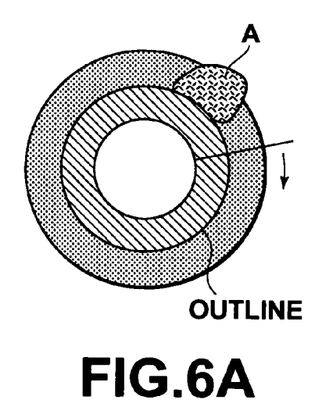
FIGS. 6A, 6B and 6C are diagrams for explaining a third case of conversion of the inner/outer outline image.
Figure 6B:
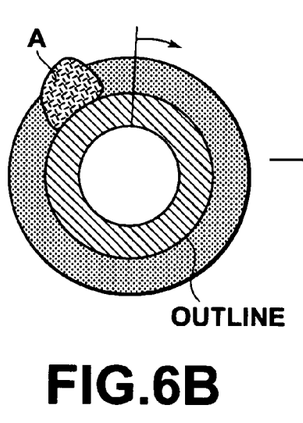
Figure 6C:
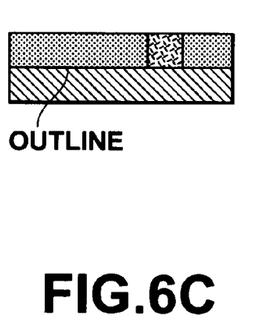

Alternatively, patterns having characteristic shapes A along the outlines thereof, as illustrated in FIGS. 6A and 6B, may be converted to uniform shapes as illustrated in FIG. 6C. Thereby, judgment of whether the patterns are similar is facilitated, by shifting the positions along the x-axis.

Figure 7A:
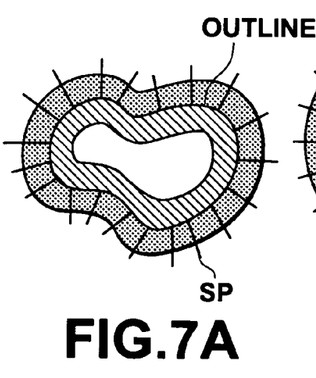
FIGS. 7A, 7B and 7C are diagrams for explaining a fourth case of conversion of the inner/outer outline image.
Figure 7B:
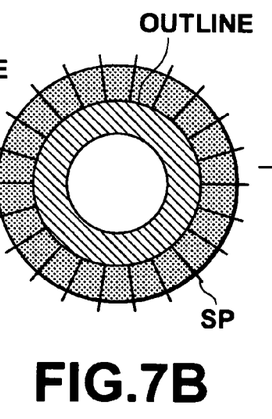
Figure 7C:
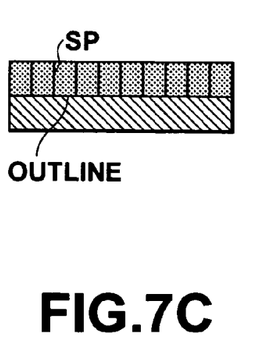

As a further alternative, patterns having spiculae SP at the edges of the outlines thereof, as illustrated in FIGS. 7A and 7B, may be converted to uniform shapes as illustrated in FIG. 7C. Thereby, detection of density patterns having characteristics in the direction perpendicular to the outlines, such as the spiculae SP, is facilitated.

Figure 8:
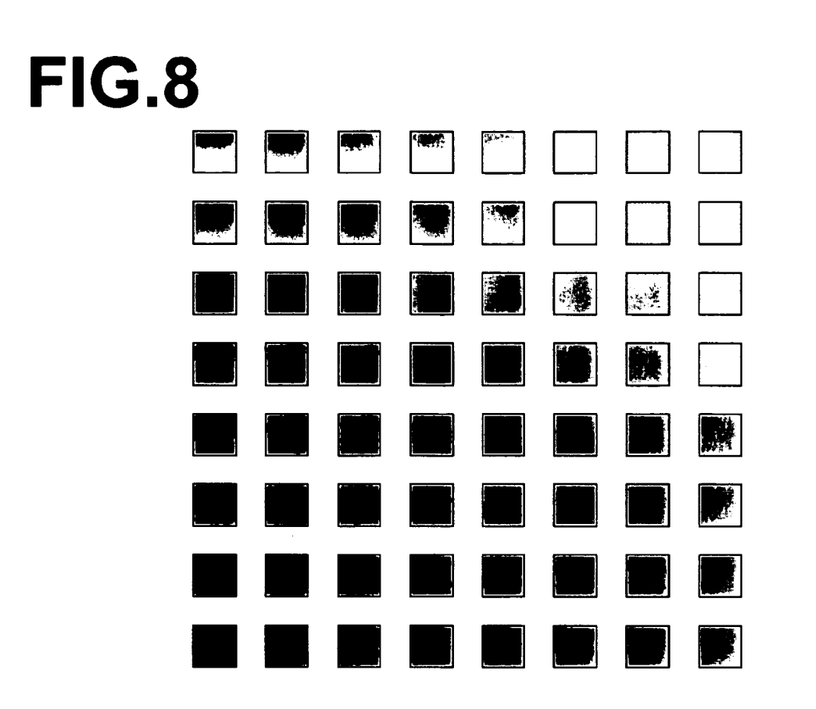
FIG. 8 is a diagram that illustrates an example of a density pattern extraction result.

The density pattern extracting means 4 extracts representative density patterns from among those which are generated within pixel groups that form small regions (hereinafter, referred to as "unit pixel groups") and constitute the inner/outer outline image D. The extracted density patterns are recorded in a density pattern extraction result recording means 40. Specifically, unit pixel groups (ROI: for example, 20 pixels×20 pixels, refer to FIG. 4B) are randomly cut out from inner/outer outline images D (for example, 180 pixels× 80 pixels) of a variety of symptoms. The randomly cut out unit pixel groups are presented to a SOM, and the representative density patterns of the unit pixel groups are extracted (details of methods of presentation to a SOM are disclosed in Japanese Unexamined Patent Publication No. 6(1994)-309457). FIG. 8 shows an example of extraction results, in which a SOM was employed to extract 64 density patterns. The extraction of the density patterns is not limited to that in which a SOM is employed. Other pattern analysis methods may be employed to extract the density patterns.

The presence frequency calculating means 5 counts the frequency that each density pattern, from among the density patterns recorded in the density pattern extraction result recording means 40, is present in the inner/outer outline images. For example, the presence frequency is derived by observing all of the unit pixel groups within the inner/outer outline image D, and counting the presence of each density pattern. Judgments regarding to which density pattern the unit pixel groups within the inner/outer outline image belong are made by observing the least squared distances, correlations and the like. Histograms of the density patterns within the inner/outer outline images D are derived, by counting the unit pixel groups according to the density patterns they are most similar to.

Alternatively, the histograms may be derived only by counting unit pixel groups which have high degrees of similarity to the density patterns. That is, unit pixel groups that are not similar to any of the density patterns are not counted. For example, unit pixel groups that have least squared distances from or correlations with density groups less than or equal to a predetermined value are counted for those density groups. In the case that no density patterns exist, for which the least squared distance or and the correlation with a unit pixel group us less than or equal to the predetermined value, the unit pixel group is not counted.

Figure 9:
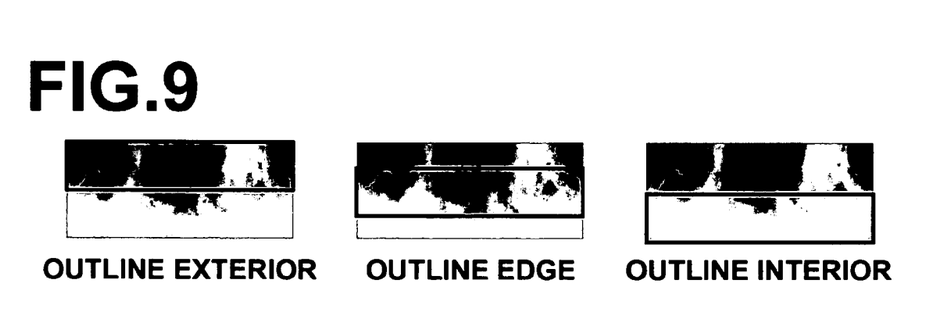
FIG. 9 is a diagram illustrating the inner/outer outline image divided into an outline edge region, an outline interior region, and an outline exterior region.
Figure 10:
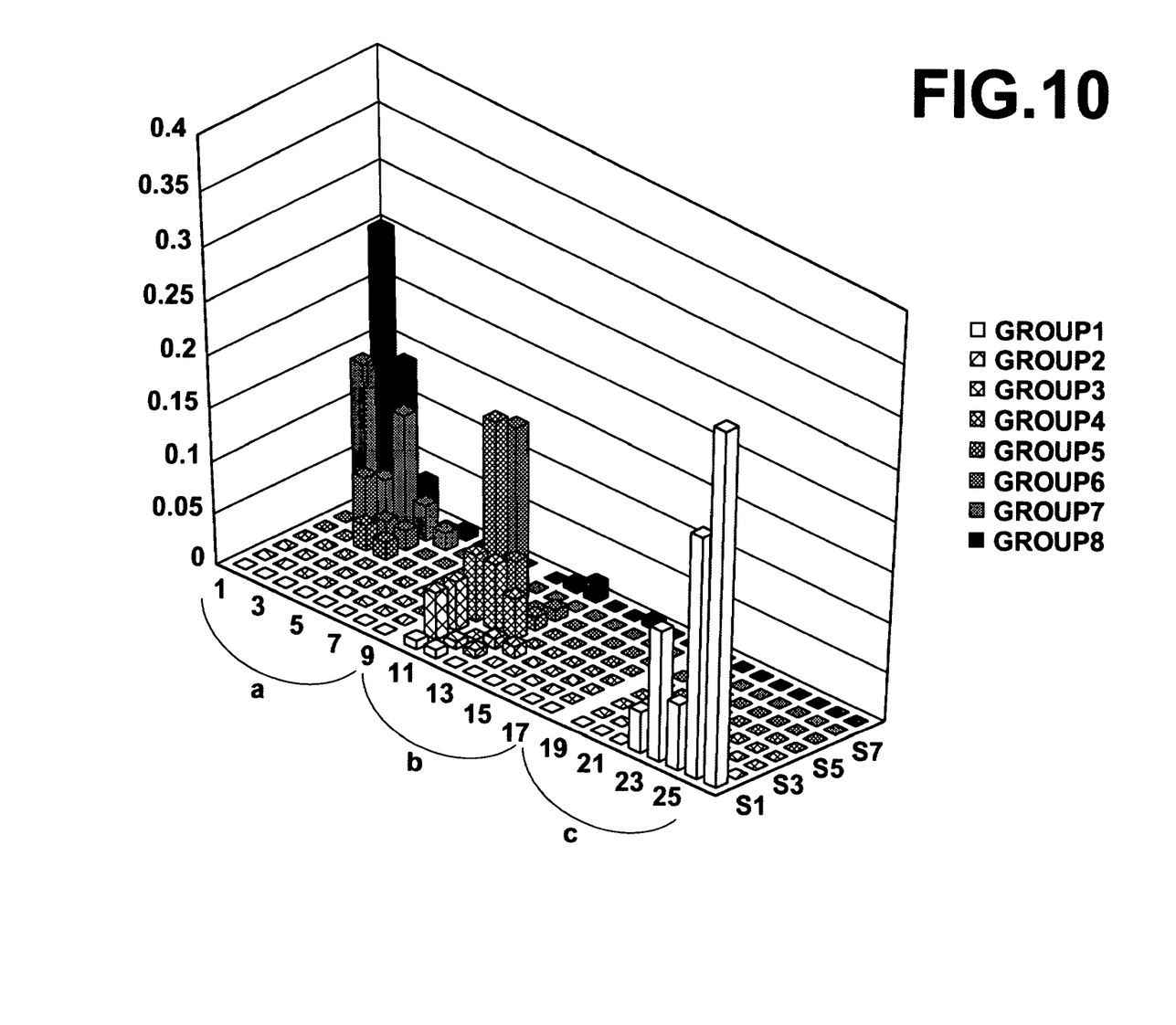
FIG. 10 is a diagram illustrating an example of a density pattern histogram.

As a further alternative, the inner/outer outline images D may be divided into outline edge regions, outline interior regions, and outline exterior regions, as shown in FIG. 9. The histograms of the density patterns may be derived for each region, to classify the types of patterns in further detail. FIG. 10 illustrates an example of a presence frequency histogram derived as a result of counting density patterns for each region. The portion denoted by "a" is the histogram of the outline interior, the portion denoted by "b" is the histogram of the outline edge, and the portion denoted by "c" is the histogram of the outline exterior. Note that the inner/outer outline images D are not limited to being divided into the outline edge regions, the outline interior regions, and the outline exterior regions. The inner/outer outline images D may alternatively be divided into the outline interior regions and the outline exterior regions. The inner/outer outline images D may be divided so that the regions do not overlap.

Figure 11:
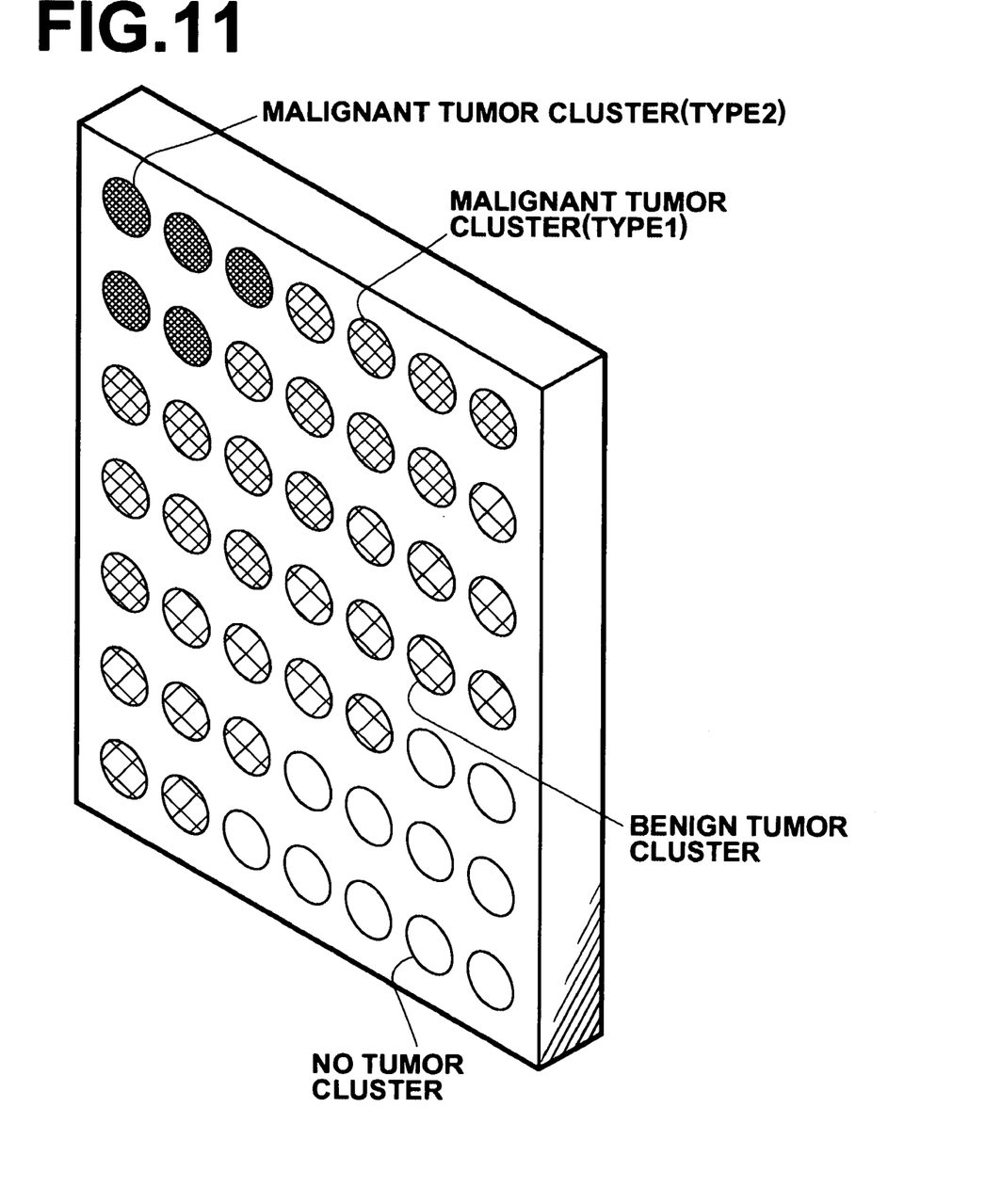
FIG. 11 is a diagram illustrating an example of a tumor map having labels thereon.

The classifying means 6 classifies the inner/outer outline images D according to the types of patterns that they correspond to, based on the presence frequencies of the density patterns. First, the presence frequencies, which were derived by the presence frequency calculating means 5, are input to an SOM, for example, according to the types of patterns (malignant abnormal pattern, benign malignant pattern, normal pattern, etc.). A pattern map, in which similar images are in proximity to each other, is obtained as shown in FIG. 11. The types of patterns are labeled on this pattern map. The classification results are recorded in a classification result recording means 60. Normal patterns are input to the pattern map, in addition to abnormal patterns. This enables judgment regarding whether an image within a candidate region is a normal pattern. It is also possible to input patterns corresponding to various symptoms, and to classify the patterns according to the symptoms.

Next, the pattern judging means 7 extracts candidate regions of interest from the medical image data S, and judges the type of pattern therein. First, the outlines of the candidate regions are extracted by the candidate region extracting means 2. Then, the inner/outer outline image extracting means 3 extracts inner/outer outline images D. Thereafter, presence frequencies of density patterns within the inner/outer outline images D are derived by the presence frequency calculating means 5. The presence frequencies obtained thereby are input to an SOM, then judgments are made regarding which types of patterns the candidate regions are similar to. Thereby, it is possible to judge whether the patterns are abnormal patterns or normal patterns. Further, judgments are possible regarding whether the patterns are benign or malignant, from among the abnormal patterns.

Alternatively, in the case that the classifying means 6 has classified the patterns according to symptoms, it is possible to judge to which symptoms the patterns within the candidate regions are similar to. Further, a configuration may be adopted wherein images similar to symptoms are accumulated within a database or the like. In this case, images similar to symptoms are searched for within the database. At this time, the diagnosis and treatment information (confirmed diagnosis results, inspection protocols, treatment protocols) for each of the images similar to symptoms may be recorded in the database correlated thereto. In this case, display of the diagnoses and treatment protocols, along with the located images similar to symptoms, is enabled.

A case has been described above in which an SOM has been employed by the classifying means 6 and the pattern judging means 7 to classify and judge the types of patterns within the inner/outer outline images D. However, it is possible to classify the inner/outer outline images into types of patterns by using alternate cluster analysis methods, such as the Mahalanobis distance method. It is also possible to classify candidate regions of interest into types of patterns by using alternate cluster analysis methods.

Figure 12:
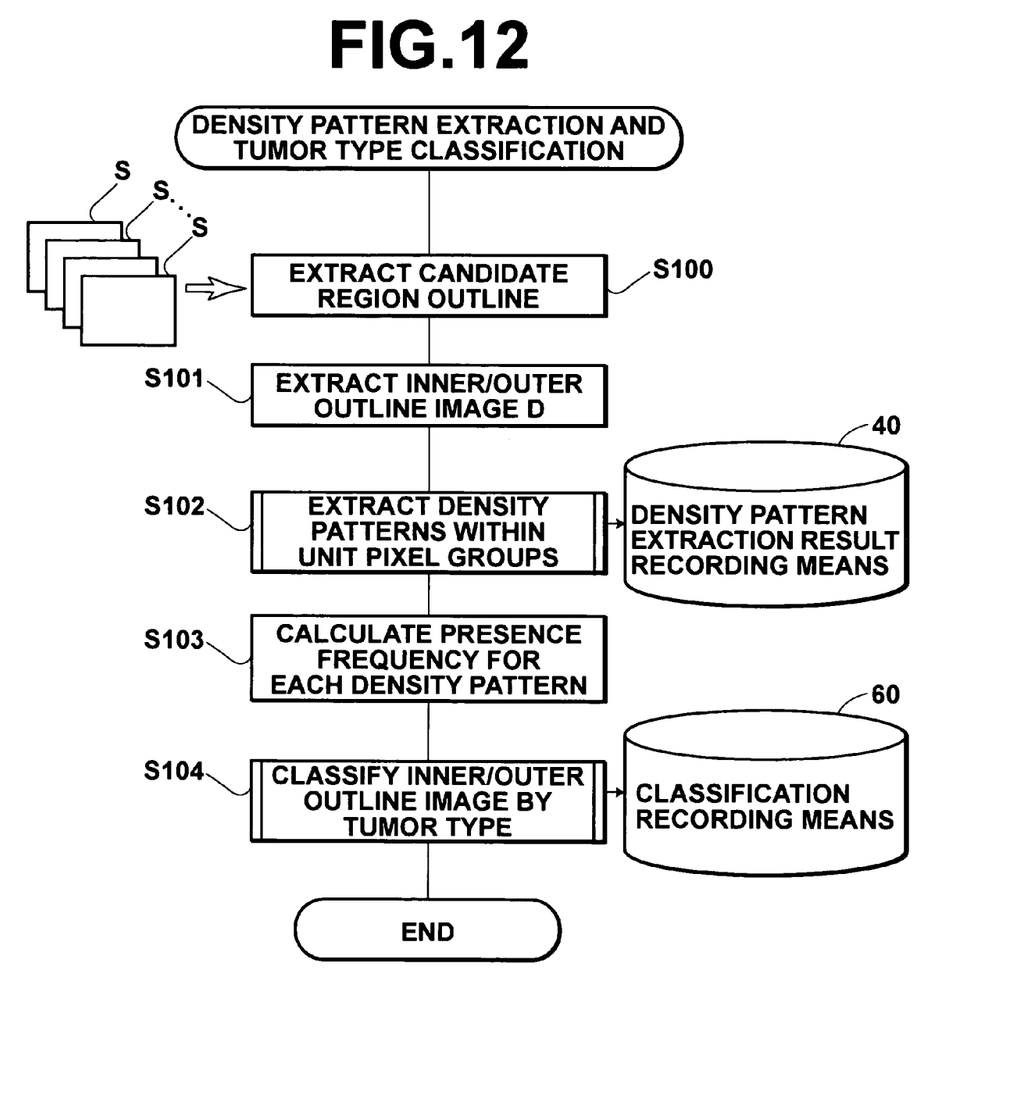
FIG. 12 is a flow chart illustrating the process of density pattern extraction and tumor type classification.
Figure 13:
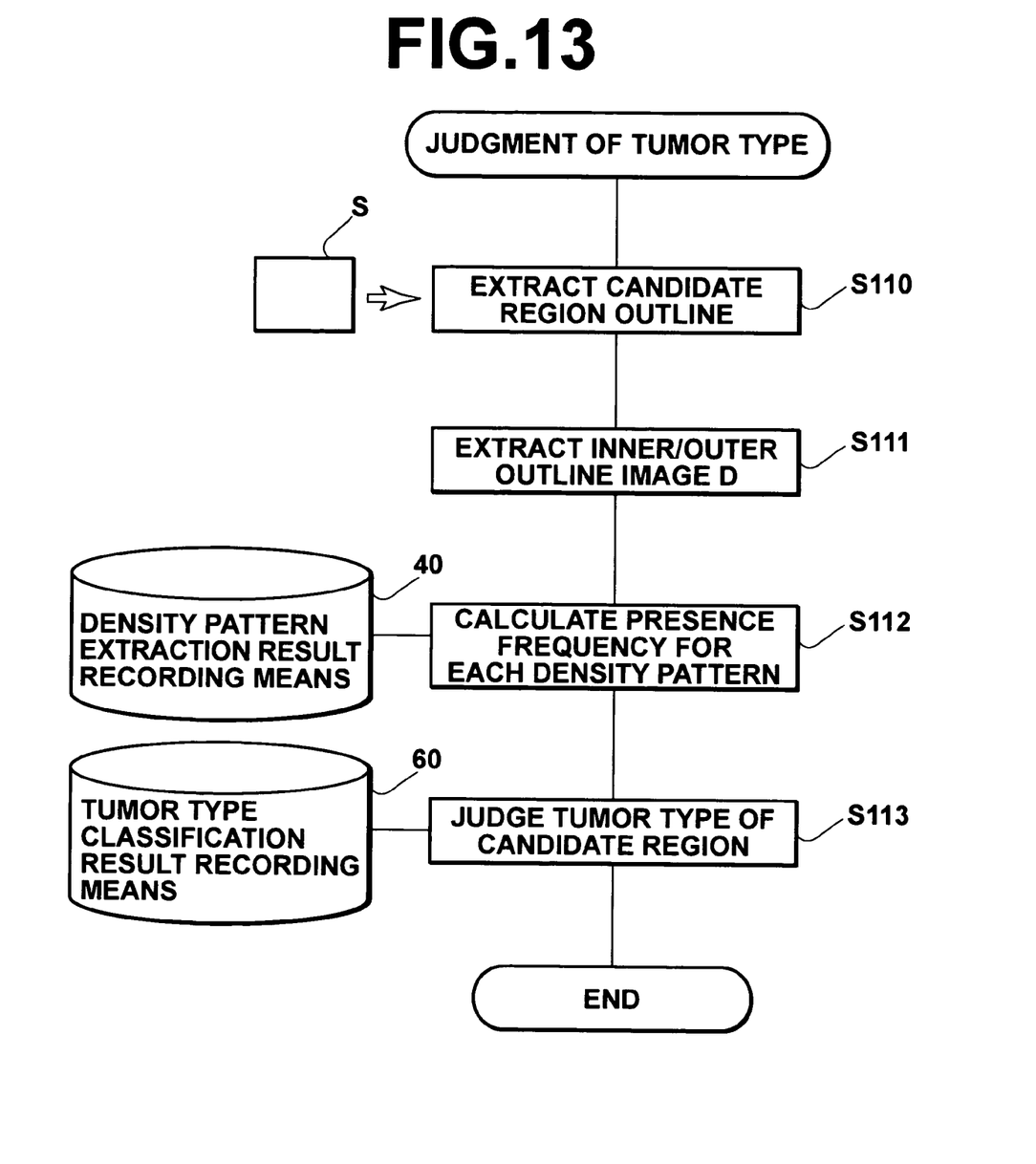
FIG. 13 is a flow chart illustrating the process of judging the tumor type of a tumor of interest.

Next, the operation of the image judging apparatus 1 will be described, with reference to the flow charts shown in FIG. 12 and FIG. 13. Here, a case will be described in which the types of patterns have been classified into tumor types.

First, the extraction of density patterns and the classification into tumor types will be described with reference to the flow chart shown in FIG. 12. Candidate regions are extracted from a great number of medical image data S, by the candidate region extracting means 2 (step S100). Inner/outer outline images D, in the vicinity of the outlines v(s) of each of the extracted candidate regions, are extracted (step S101). The density pattern extracting means 4 repeatedly inputs unit pixel groups (ROI), which are randomly cut out from the inner/outer outline images D extracted from the great number of medical image data S, into an SOM. Representative density patterns of the unit pixel groups are extracted, and recorded in the density pattern extraction result recording means 40 (step S102).

Here, the presence frequencies of the extracted density patterns are calculated for each of the extracted inner/outer outline images D by the presence frequency calculating means 5 (step S103). The calculated density pattern presence frequencies are repeatedly presented to the SOM, the inner/outer outline images D are classified into tumor types, and the classification results are recorded in the classification result recording means 60 (step S104). At this time, it is desirable to employ medical images representing a great number of symptoms during the extraction of density patterns from the unit pixel groups and the classification into tumor types.

Next, the judgment regarding the tumor type of a candidate region of interest will be described with reference to the flow chart shown in FIG. 13. First, the pattern judging means 7 extracts a candidate region of interest from medical image data S (step S110). Then, the inner/outer outline image extracting means 3 extracts an inner/outer outline image D from the outlines of the extracted candidate regions (step S111). Thereafter, presence frequencies of density patterns, which are recorded in the density pattern extraction result recording means 40, within the inner/outer outline image Dare counted for each density pattern (step S112). A histogram is obtained, based on the presence frequencies. The histogram is input to an SOM, and a judgment is made regarding which type of pattern the candidate region belong to, based on the tumor map, which is recorded in the classification result recording means 60 (step s113).

Figure 14:
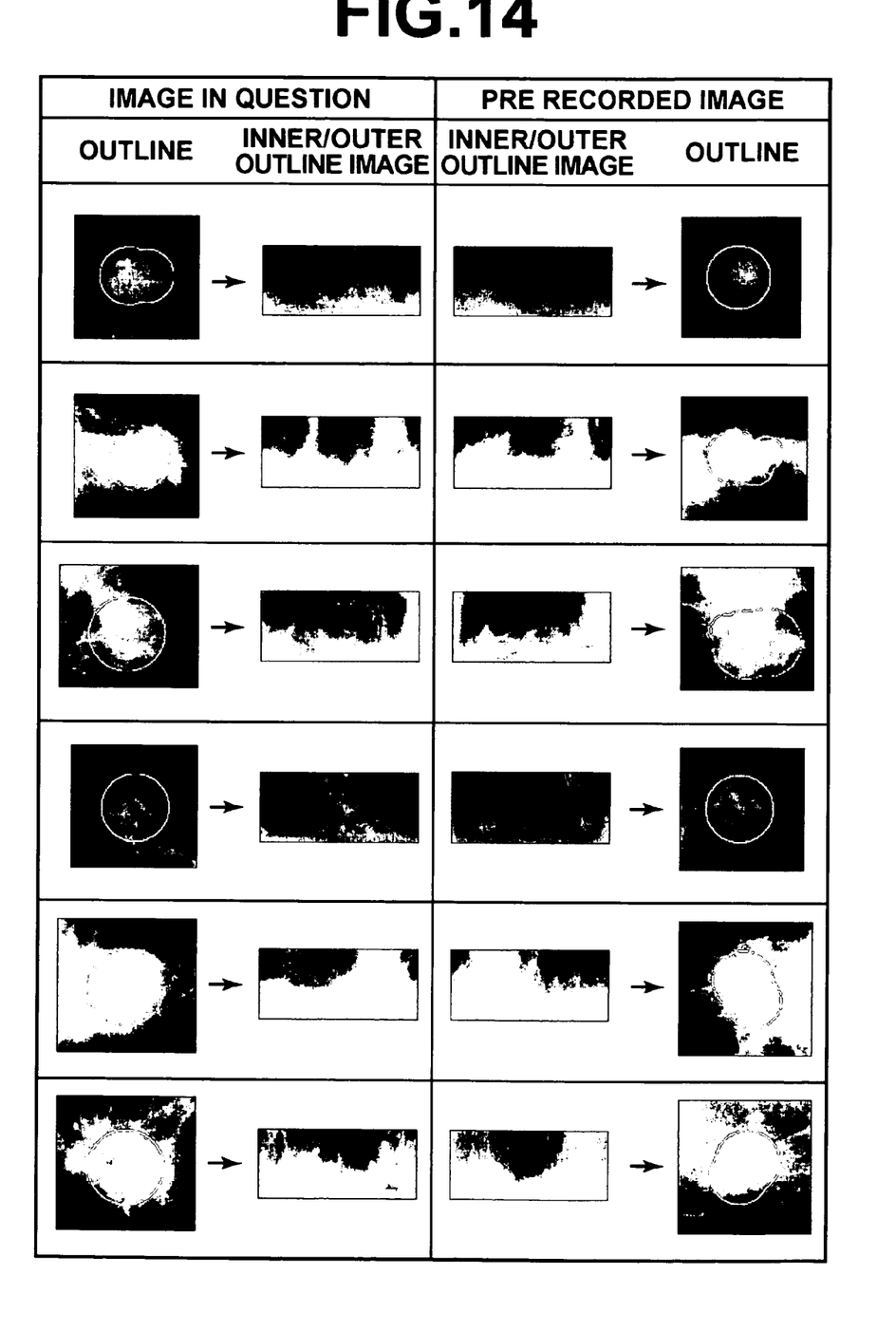
FIG. 14 is a table showing judgment results of the image judging apparatus.

FIG. 14 is a table that shows the results of actual judgments made employing the image judging apparatus 1. The left column has therein images of interest, and the right column has therein the prerecorded images obtained corresponding to the images of interest. By obtaining outlines of the images of interest and generating inner/outer outline images D, prerecorded images corresponding to similar inner/outer outline images are located. Therefore, it is observed that visually similar images are obtained.

In the embodiment described above, a case is described in which the presence frequencies of the density patterns which are present in the vicinity of the outlines of the candidate regions are employed as characteristic amounts during judgments. Other characteristic amounts based on density histograms of the inner/outer outline images D, such as dispersion values, contrasts, and angular moments, may be employed as the characteristic amounts (for details on characteristic amounts related to density histograms, refer to Japanese Unexamined Patent Publication No. 9-167238).

As described in detail above, the present invention enables judgment regarding whether a candidate region of a pattern is a normal or an abnormal pattern, regardless of the size or shape of the outline thereof. Detection of symptoms similar to the pattern of the candidate region is also enabled. This is made possible by employing characteristic amounts which are present in the vicinity of the outline of the candidate region.

Further, by employing the density patterns, it is possible to obtain judgment results that approximate human visual perception.

What is claimed is:

1. An image judging apparatus, comprising:
    a candidate region extracting means for extracting candidate regions for predetermined patterns from medical image data;
    an inner/outer outline image extracting means for extracting inner/outer outline images corresponding to an inner/outer outline region, which are in the vicinity of the outline of the candidate regions extracted by the candidate region extracting means;
    a pattern judging means for judging the type of pattern within the candidate regions, by employing characteristic amounts of the inner/outer outline image extracted by the inner/outer outline image extracting means;
    a density pattern extracting means, for extracting density patterns, which are present within unit pixel groups that constitute the inner/outer outline images, extracted by the inner/outer outline image extracting means;
    a presence frequency calculating means, for judging which of the density patterns the unit pixel groups of the inner/outer outline images are similar to, and calculating presence frequencies by counting the presence of the similar density patterns within the inner/outer outline image; and
    a classifying means, for classifying the inner/outer outline images according to the type of pattern, based on the presence frequencies of the density patterns; wherein
    the pattern judging means judges to which classification the candidate region belongs, from among the classifications of the inner/outer outline images, which were classified according to the type of pattern by the classifying means, by employing the presence frequencies of the density patterns therein, derived by the presence frequency calculating means, as characteristic amounts; and
    the inner/outer outline region includes the entire outline of the candidate regions.

2. An image judging apparatus as defined in claim 1, wherein the type of pattern is one of a normal pattern, an abnormal pattern, a benign abnormal pattern, and a malignant abnormal pattern.

3. An image judging apparatus as defined in claim 1, wherein the type of pattern is classified according to a sign.

4. An image judging apparatus as defined in claim 1, wherein:
    the inner/outer outline image extracting means divides the inner/outer outline image into two or more regions comprising an outline edge, an outline interior and an outline exterior; and
    the pattern judging means judges the type of pattern based on the characteristic amount of at least one of the regions.

5. The apparatus as defined in claim 4, wherein the outline edge region is a region which straddles the outline of the candidate regions, outline interior region is a region between the inner edge of the inner/outer region and the outline of the candidate regions, and the outline exterior region is a region between the outer edge of the inner/outer region and the outline of the candidate regions.

6. The apparatus as defined in claim 1, wherein the inner/outer outline region includes inward vicinity and outward vicinity of the outline of the candidate regions.

7. An image judging apparatus as defined in claim 6, wherein edges of said inner/outer outline region are within a predetermined distance from the edge of the outline of the candidate regions.

8. The apparatus as defined in claim 1, wherein the inner/outer outline region is within a range from edge of the outline of the candidate regions.

9. The apparatus as defined in claim 1, wherein the inner/outer outline images are divided into outline edge regions, outline interior regions, and outline exterior regions.

10. An image judging apparatus as defined in claim 1, wherein the type of pattern is only an abnormal pattern.

11. An image judging apparatus as defined in claim 10, wherein an abnormal pattern is characterized that it represents symptoms of at least one of tumors, tumorous boils, and cancer.

12. The apparatus as defined in claim 1, wherein the type of pattern within the candidate regions is classified by: determining density patterns within each of small regions that constitute the inner and outer outline images, and obtaining the frequencies at which the density patterns appear within all of the small regions of the inner and outer outline images.

13. A method for judging images, comprising the steps of:
    extracting candidate regions of specific patterns from medical image data;
    extracting inner/outer outline images corresponding to an inner/outer outline region, which are in the vicinity of the outline of the extracted candidate regions; and judging the type of pattern within the candidate regions, by employing characteristic amounts of the extracted inner/outer outline image;

wherein the inner/outer outline region includes the entire outline of the candidate regions, and the type of pattern within the candidate regions is classified by determining density patterns within each of small regions that constitute the inner/outer outline images, and obtaining the frequencies at which the density patterns appear within all of the small regions of the inner/outer outline images, with a computer performing the classifying.

14. The method as defined in claim 13, wherein the inner/outer outline region includes inward vicinity and outward vicinity of the outline of the candidate regions.

15. The method as defined in claim 13, wherein the inner/outer outline region is within a range from edge of the outline of the candidate regions.

16. The method as defined in claim 13, wherein the inner/outer outline images are divided into outline edge regions, outline interior regions, and outline exterior regions.

17. A computer readable medium having recorded therein a program that causes a computer to execute a method for judging images, comprising the procedures of:

extracting candidate regions of specific patterns from medical image data;

extracting inner/outer outline images corresponding to an inner/outer outline region, which are in the vicinity of the outline of the extracted candidate regions; and judging the type of pattern within the candidate regions, by employing characteristic amounts of the extracted inner/outer outline image;

wherein the inner/outer outline region includes the entire outline of the candidate regions, and the type of pattern within the candidate regions is classified by determining density patterns within each of small regions that constitute the inner/outer outline images, and obtaining the frequencies at which the density patterns appear within all of the small regions of the inner/outer outline images.

18. The computer readable medium as defined in claim 17, wherein the inner/outer outline region includes inward vicinity and outward vicinity of the outline of the candidate regions.

19. The computer readable medium as defined in claim 17, wherein the inner/outer outline region is within a range from edge of the outline of the candidate regions.

20. The computer readable medium as defined in claim 17, wherein the inner/outer outline images are divided into outline edge regions, outline interior regions, and outline exterior regions.

* * * * *